US008943665B2

(12) United States Patent
Walawender et al.

(10) Patent No.: US 8,943,665 B2

(45) Date of Patent: Feb. 3, 2015

(54) MOTOR VEHICLE WINDOW REGULATOR WITH LOW FRICTION GUIDE RAILS

(71) Applicant: Ford Global Technologies, LLC, Dearborn, MI (US)

(72) Inventors: Chester S. Walawender, Livonia, MI (US); Joshua M. Myers, Rochester Hills, MI (US); Edward T. Kozak, Troy, MI (US); Douglas L. Wilson, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 187 days.

(21) Appl. No.: 13/707,833

(22) Filed: Dec. 7, 2012

(65) Prior Publication Data

US 2014/0157677 A1 Jun. 12, 2014

(51) Int. Cl.

*B23P 25/00* (2006.01)
*E05D 15/16* (2006.01)
*E05F 11/38* (2006.01)

(52) U.S. Cl.

CPC .............. *E05D 15/165* (2013.01); *E05F 11/38* (2013.01); *E05F 11/382* (2013.01); *E05Y 2201/61* (2013.01); *E05Y 2201/684* (2013.01); *E05Y 2800/108* (2013.01); *E05Y 2800/45* (2013.01); *E05Y 2800/67* (2013.01)

USPC .............................................................. 29/458

(58) Field of Classification Search

USPC .......... 29/412, 414, 417, 426.5, 527.1, 527.2, 29/434, 458, 460, 428; 74/89, 324

See application file for complete search history.

(56) References Cited

U.S. PATENT DOCUMENTS

| | | | | |
|---|---|---|---|---|
| 4,572,872 | A | 2/1986 | Yamazaki et al. | |
| 4,805,346 | A * | 2/1989 | Gergoe | 49/352 |
| 4,954,553 | A * | 9/1990 | Johnson et al. | 524/376 |
| 5,513,468 | A | 5/1996 | Diestelmeier | |
| 6,170,197 | B1 | 1/2001 | Tyves et al. | |
| 6,516,493 | B1 | 2/2003 | Seliger et al. | |
| 6,553,720 | B2 | 4/2003 | Merlet | |
| 7,555,868 | B2 | 7/2009 | Tenorio et al. | |
| 2002/0111228 | A1 * | 8/2002 | Chang | 473/324 |
| 2011/0047878 | A1 | 3/2011 | Raisoni et al. | |

FOREIGN PATENT DOCUMENTS

DE 3503479 A1 8/1985

OTHER PUBLICATIONS

The Whitford Engineering Design Guide, Jan. 2006, pp. 1-41.

* cited by examiner

*Primary Examiner* — John C Hong

(74) *Attorney, Agent, or Firm* — Jason Rogers; MacMillan, Sobanski & Todd, LLC

(57) ABSTRACT

A motor vehicle window regulator in which a matrix coating is applied to a metal blank. The matrix coating is comprised of particles of a fluoropolymer (such as polytetrafluoroethylene) carried in an organic polymer binder. The coated metal blank is cold-formed to the shape of a guide rail with a longitudinal track disposed along an edge of the guide rail. A window slider is mounted onto the guide rail to slide along the longitudinal track, so that the fluoropolymer particles lubricate the sliding of the window slider on the longitudinal track.

13 Claims, 3 Drawing Sheets

MOTOR VEHICLE WINDOW REGULATOR WITH LOW FRICTION GUIDE RAILS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to window regulators, and, more specifically, to a guide rail for receiving a window slider and having a low friction, self-cleaning coating for reducing noise, wear, and corrosion.

A window regulator for a motor vehicle is a mechanism that controls the raising, lowering and positioning of a window, such as a side door window. For a typical power window application, the regulator includes one or more rails, window clamps and sliders configured to ride on the rails and configured to secure the glass (i.e., window), a motor assembly, and cables coupling the motor to the window sliders in order to move them on the rails in a coordinated fashion. For a manual window application, a hand crank is used instead of a motor.

Conventional window regulator systems have been subject to various performance problems that lead to customer dissatisfaction. One such problem is noisy operation as the door glass is fully or partially raised or lowered. Squeaks, scrapes, or buzzing sounds often occur as the slider moves along the guide rail. These problems typically worsen over time due to washout of oils and lubricants and/or a buildup of corrosion. Another performance problem relates to blocked or intermittent movement of the door glass windows at cold temperatures when moisture becomes frozen onto the guide rails or sliders.

The present invention involves providing a particular coating which may be applied as a paint or a dry film and then cured on the guide rail that overcomes each of the foregoing problems.

SUMMARY OF THE INVENTION

In one aspect of the invention, a method is provided for manufacturing a motor vehicle window regulator. A matrix coating is applied to a metal blank, wherein the matrix coating is comprised of particles of a fluoropolymer carried in an organic polymer binder. Application may be by dipping, brushing, or spraying of the metal blank followed by curing of the matrix coating. The coated metal blank is cold-formed to the shape of a guide rail with a longitudinal track disposed along an edge of the guide rail. A window slider is mounted onto the guide rail to slide along the longitudinal track, so that the fluoropolymer particles lubricate the sliding of the window slider on the longitudinal track. The matrix coating also reduces corrosion and limits the ability of water to freeze onto the guide rail.

In particular, the matrix coating may be comprised of polytetrafluoroethylene (PTFE) with carbon black silicon carbide, bisphenol A epoxy resin, and a catalyst resin. The constituents of the coating allow cross-linking of the catalysts and appropriate flow agents to the material of the window regulator rails guide itself. The metal blank for forming the rail guide may be hot-dipped galvanized, electro-galvanized, e-coated, or phosphate pre-treated before applying the coating. The blank may include a single layer or bi-metallic joined layers. Acceptable metals include tin-free steel, alloyed steels, aluminum, and aluminum alloys.

In a coil coating process, a coil of metallic substrate material would be cleaned, rinsed, and dried before being dipped into an uncured coating mixture. The metal preferably passes through rollers to squeegee the coating to a desired thickness. Then it is dried and cured before re-rolling back into a coil and shipping to a location where it is formed into the desired guide rails. Similarly, pneumatic (e.g., spraying) and mechanical (e.g. brushed or rolled) application processes would include cleaning, drying, and curing steps to ensure good adhesion of the matrix coating to the metal blank.

DETAILED DESCRIPTION OF PREFERRED EMBODIMENTS

Figure 1:
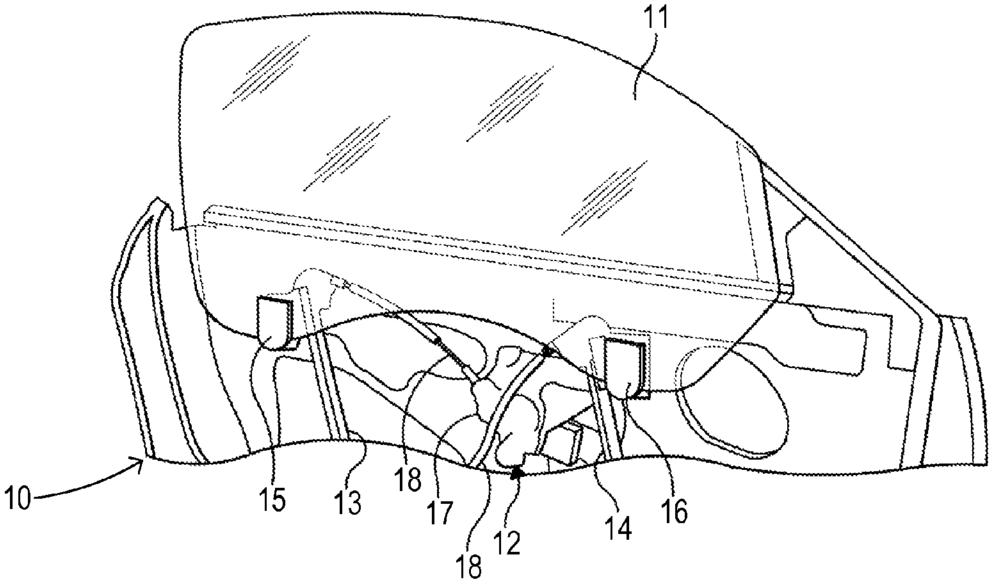
FIG. 1 is a partial interior view of a window regulator installed in a motor vehicle door.

Referring now to FIG. 1, a vehicle side door 10 receives a sliding glass side window panel 11 supported by a window regulator system 12. Window regulator system 12 includes guide rails 13 and 14 for slidably receiving window sliders 15 and 16 to which glass panel 11 is clamped. A motor 17 is coupled via a cable system 18 to sliders 15 and 16 in order to raise and lower glass panel 11 as is well known in the art.

Figure 2:
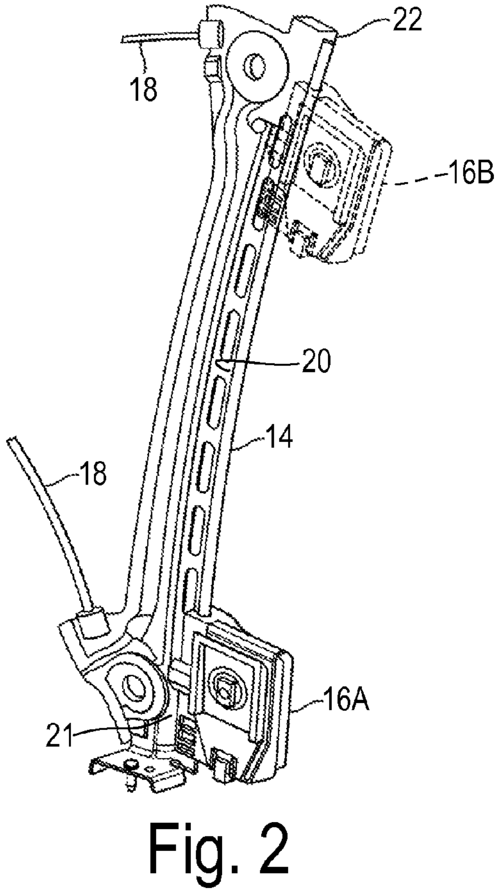
FIG. 2 is a perspective view of a guide rail and window slider of FIG. 1.

FIG. 2 shows guide rail 14 in greater detail having a longitudinal track 20 extending between a bottom end 21 and an upper end 22. The slider is shown in a lower position at 16A and in phantom for an upper position at 16B. Guide rail 14 is comprised of steel that may be roll-formed or stamped (e.g., an alloy such as 1010 steel). Slider 16 may be comprised of a plastic material such as Acetal. The present invention reduces noisy operation, improves lubrication, reduces freezing, and limits corrosion by application of a matrix coating onto guiderail 14. The coating fully covers longitudinal track 20, and preferably covers all exterior surfaces of guide rail 14.

In one preferred embodiment, an 8-micron organic polymer coating is employed, such as Xylan® 89-700 available from Whitford Corporation, Elverson, Pa. The matrix coating is comprised of particles of a fluoropolymer carried in an organic polymer binder. The fluoropolymer particles incorporated into the matrix each has a major diameter (i.e., a longest diameter) of less than about 25 microns. More preferably, each has a major diameter less than about 8 microns. In use, the particles of fluoropolymer lubricate the sliding of the window slider on the longitudinal track to provide a nearly friction-free and silent operation. Over time, the fluoropolymer particles gradually migrate out of the matrix and onto the surface thereby maintaining lubricity during the service lifetime of the guide rail. The coating improves corrosion protection of the guide rails and avoids the need for the addition of any separate lubricants. A preferred fluoropolymer for the particles is polytetrafluoroethylene (PTFE). The organic polymer binder is chosen to provide good adherence on either a galvanized or bare metal surface of the guide rail, and may be comprised of silicon carbide or bisphenol A epoxy resin, for example.

In order to achieve efficient and cost effective manufacturing of the guide rails, the matrix coating of the present invention is applied to a metal blank before being shaped to the configuration of a guide rail.

Figure 3:
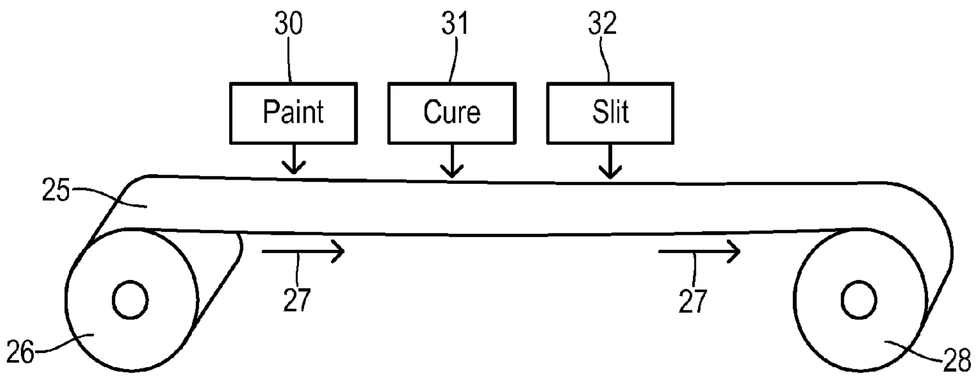
FIG. 3 is a schematic diagram of the preparation of a steel coil with the coating of the invention.

Referring to FIG. 3, a sheet 25 of steel coil from a spool 26 is unspooled in the direction 27 for coating. After coating, it is respooled on a spool 28. The matrix coating is applied with a painting process 30 onto both sides of sheet 25. Paint process 30 may employ any application method known in the art, including spraying. The advancing steel sheet 25 then passes through a curing process 31 which may include heating or other parameters depending on the particular formulation and other properties of the painted matrix coating. Following curing, a slit process 32 may be performed in which steel sheet 25 is partially cut along lines that define individual guide rail blanks.

Figure 4:
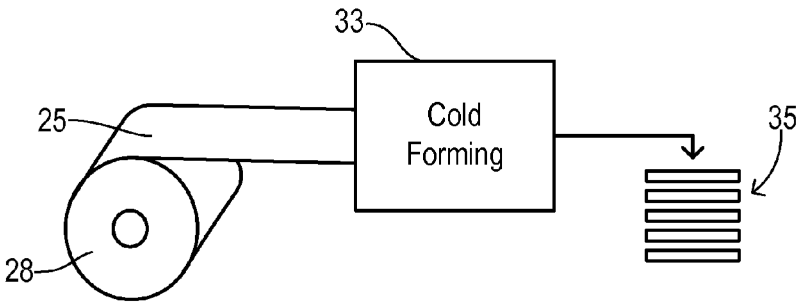
FIG. 4 is a schematic diagram of the final shaping of a guide rail using the coated steel from FIG. 3.

Spool 28 containing the coated steel coil is moved to a forming process as shown in FIG. 4. Steel sheet 25 is processed through a cold forming process 33 such as stamping or rolling. The stamping or rolling performed in cold-forming process 33 is substantially identical to any process as has been previously used for forming non-coated guide rails. The matrix coating remains intact during the cold-forming process. Individual blanks are cold formed and then separated to produce a stream of coated guide rails 35.

Figure 5:
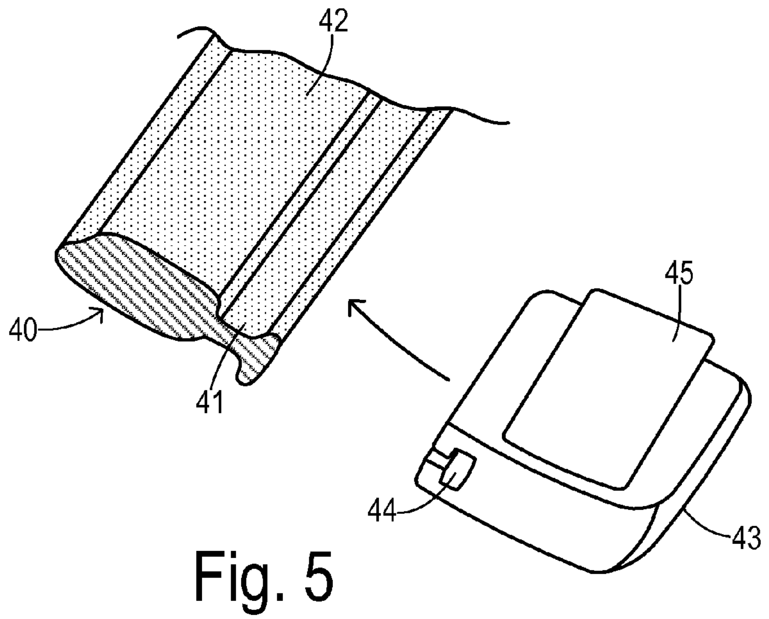
FIG. 5 is a perspective view showing the mounting of a window slider to the coated guide rail of the invention.

FIG. 5 shows a guide rail 40 with a longitudinal track 41 in greater detail, wherein a matrix coating 42 covers all of the exterior surfaces of guiderail 40. A window slider 43 has a guide slot 44 for receiving longitudinal track 41 and a clamp 45 for receiving a glass window panel (not shown). By virtue of the fluoropolymer particles in matrix coating 42, window slider 43 mounted on longitudinal track 41 stays well lubricated since the fluoropolymer particles are continually replenish at the surface of longitudinal track 41 over time.

Figure 6:
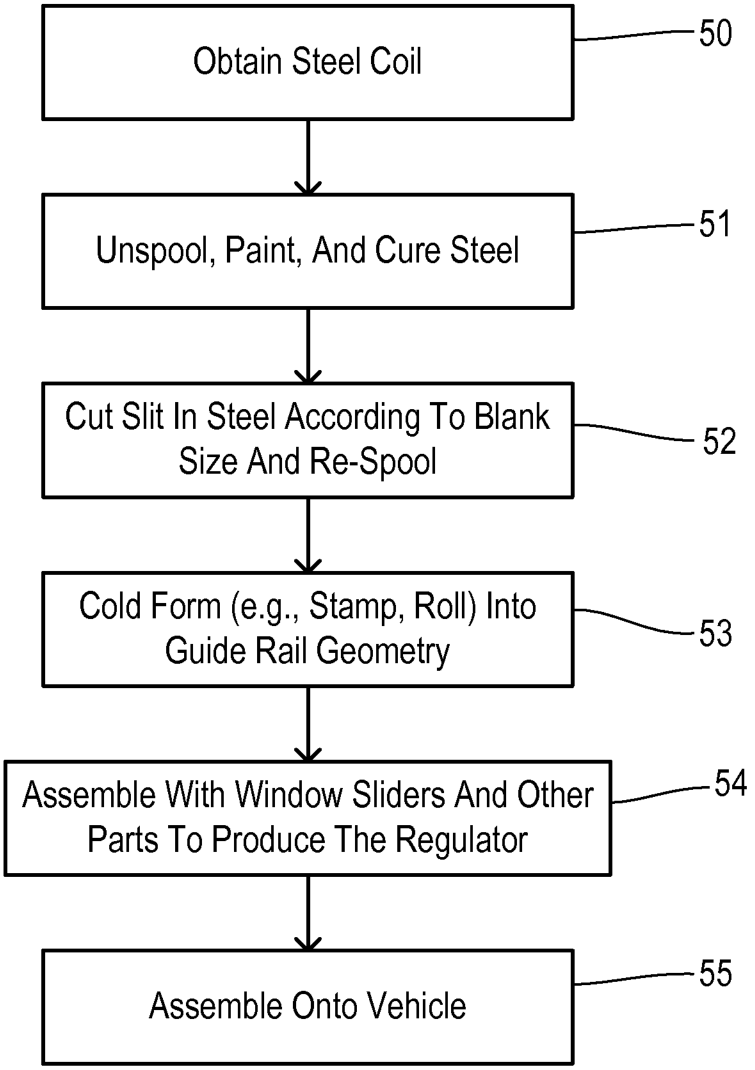
FIG. 6 is a flowchart showing a preferred embodiment of a method of the invention.

FIG. 6 summarizes a preferred method of manufacturing a guide rail and assembling a window regulator onto a vehicle. In step 50, a steel coil such as 1010 steel is obtained. At a coating facility, the steel coil is unspooled, painted with a matrix coating, and cured in step 51. If desired, a slit may be cut in the spool according to the blank size and then respooled in step 52. The coated steel spool is then relocated to a metalworking facility where it is cold formed into the guide rail geometry in step 53. The resulting guide rails are assembled with window sliders and other parts in order to produce a window regulator in step 54. The window regulator is delivered to a vehicle assembly plant where it is assembled onto a vehicle along with a glass window panel in step 55. The resulting window regulator system provides nearly friction free operation with greatly reduced noise, reduced corrosion, and greater resistance to freezing.

What is claimed is:

1. A method of manufacturing a motor vehicle window regulator, comprising the steps of:
applying a matrix coating to a metal blank, wherein the matrix coating is comprised of particles of a fluoropolymer carried in an organic polymer binder;
cold-forming the coated metal blank to the shape of a guide rail with a longitudinal track disposed along an edge of the guide rail; and
mounting a window slider onto the guide rail to slide along the longitudinal track, so that the particles of fluoropolymer lubricate the sliding of the window slider on the longitudinal track.

2. The method of claim 1 wherein the fluoropolymer particles are comprised of polytetrafluoroethylene (PTFE).

3. The method of claim 1 wherein the applying step is comprised of painting the fluoropolymer coating onto the metal blank and curing.

4. The method of claim 1 wherein the cold-forming step is comprised of rolling.

5. The method of claim 1 wherein the cold-forming step is comprised of stamping.

6. The method of claim 1 wherein the fluoropolymer particles each has a major diameter less than about 25 microns.

7. The method of claim 1 wherein the fluoropolymer particles each has a major diameter less than about 8 microns.

8. The method of claim 1 wherein the step of applying the matrix coating to the metal blank is comprised of:
unrolling a metal coil;
applying the matrix coating to the unrolled metal coil to a desired thickness in an uncured state;
curing the matrix coating;
cutting a slit in the metal coil corresponding to the metal blank; and
re-rolling the metal coil.

9. A window regulator for a motor vehicle, comprising:
a guide rail having a body covered by a matrix coating comprised of particles of a fluoropolymer carried in an organic polymer binder, the guide rail having a longitudinal track disposed along an edge of the guide rail; and
a window slider slidably mounted on the longitudinal track, so that the fluoropolymer particles lubricate the sliding of the window slider on the longitudinal track.

10. The window regulator of claim 9 wherein the body is comprised of steel.

11. The window regulator of claim 9 wherein the fluoropolymer particles are comprised of polytetrafluoroethylene (PTFE).

12. The window regulator of claim 11 wherein the PTFE particles each has a major diameter less than about 25 microns.

13. The window regulator of claim 11 wherein the PTFE particles each has a major diameter less than about 8 microns.

* * * * *